United States Patent

[11] 3,584,422

| [72] | Inventor | Ivan Andreevich Stepanov<br>Ul. Kommunisticheskaya.12/23,KV.21,<br>Vitebsk, U.S.S.R. |
|---|---|---|
| [21] | Appl. No. | 737,226 |
| [22] | Filed | June 14, 1968 |
| [45] | Patented | June 15, 1971 |

[54] MACHINE FOR PRODUCING CONVEX ROLLING SURFACE OF ROLLERS
2 Claims, 5 Drawing Figs.

| [52] | U.S. Cl. | 51/73 |
|---|---|---|
| [51] | Int. Cl. | B24b 9/00 |
| [50] | Field of Search | 51/3, 73, 102, 130, 289, 289 S; 146/49.2 |

[56] References Cited
UNITED STATES PATENTS

| 597,033 | 1/1898 | Tebbetts | 51/130 |
|---|---|---|---|
| 989,524 | 4/1911 | Hasselkus | 51/130 |
| 1,345,468 | 7/1920 | Wingquist | 51/130 |

*Primary Examiner*—Othell M. Simpson
*Attorney*—Waters, Roditi, Schwartz & Nissen ABSTRACT: A machine for producing a convex rolling surface for rollers. The machine includes a drum having on its outer surface a spiral groove for accommodating rollers being machined. A tool is made hollow and communicates with the drum disposed inside thereof. The tool has an inside surface which is a working surface corresponding to the outer surface of the drum. The tool is pressed against rollers being machine with the aid of a pressing means which is a pneumatic cylinder producing the desired rolling surface for rollers.

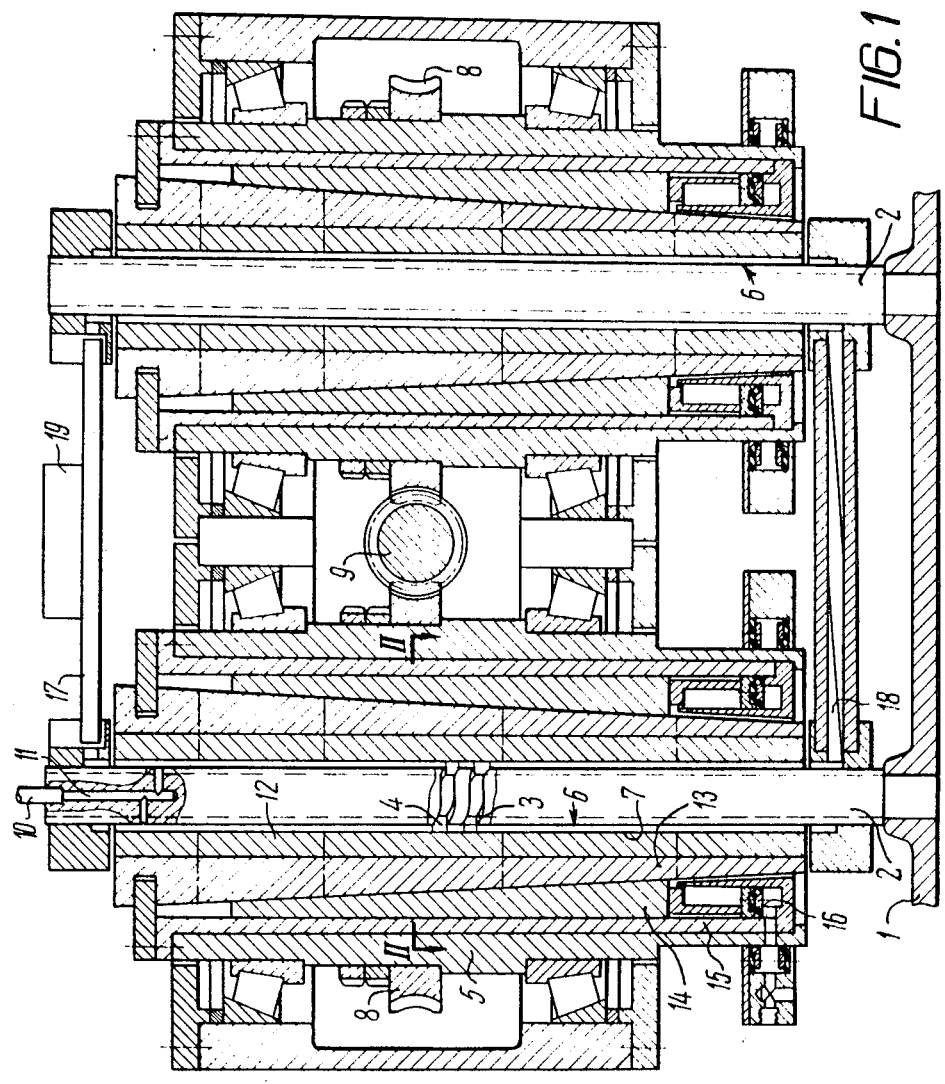

MACHINE FOR PRODUCING CONVEX ROLLING SURFACE OF ROLLERS

The present invention relates to machines intended for machining rolling bearings, in particular to machines for producing convex rolling surface of the rollers.

Known in the art is a machine for producing convex rolling surface of rollers comprising a drum having a spiral groove and a bearing knife serving for the distribution of the rollers to be machined. The machining is performed by a shaped grinding wheel.

A disadvantage of said machine consists in that it fails to ensure high accuracy and surface finish of the rollers with convex rolling surface.

The main object of this invention is to develop such a machine for producing convex rolling surface of rollers, which would ensure high accuracy and surface finish, would be capable of simultaneous machining of all the working surfaces of the roller and would provide high machine output.

These objects are achieved by providing a machine for producing convex rolling surface of rollers said machine comprising at least one drum having a spiral groove for distributing and guiding the rollers to be machined and at least one machine tool. According to the invention, the tool is made hollow and its inside surface corresponds to that of the drum arranged coaxially in said cavity of the tool said tool tightly pressing the rollers to be ground while it rotates around the drum, said rollers moving along the spiral grooves and protruding therefrom.

In case the drum and the inside surface of the tool are cylindrical it is reasonable to make the tool split along the longitudinal planes thereof, to create a working pressure between the tool and rollers.

In case the drum and inside surface of the tool are conical is no less reasonable to make an one-piece tool and to ensure the required working pressure between the rollers and tool by moving the latter axially.

The machine made according to this invention ensures the production of rollers with convex rolling surface which are accurate to within 0.2 microns with respect to their roundness as measured in three points, the deviation from the theoretical profile being within 0.5 microns.

Given below is a description of an embodiment of the invention with reference to the appended drawings, wherein:

FIG. 1 is a longitudinal section of a machine for producing convex rolling surface of rollers according to the invention;

Figure 3:
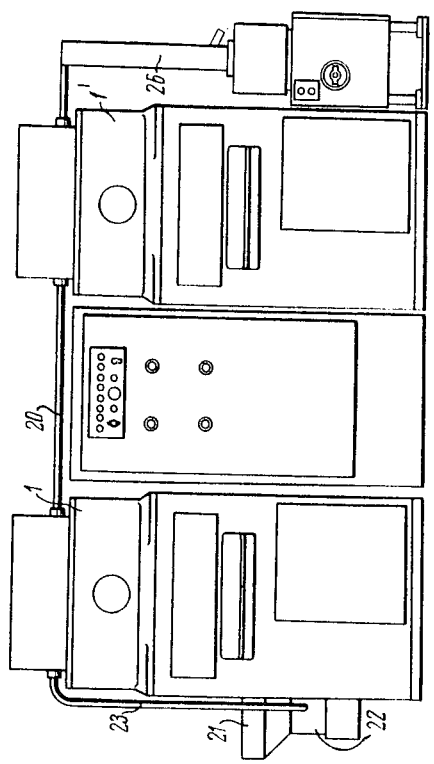
FIG. 3 is a general view of a machine for producing convex rolling surface of rollers.

The machine for producing convex rolling surface of rollers comprises a housing 1 (FIG. 1) which carries a fixed drum 2 with a spiral groove 3 on its outer surface. The spiral groove 3 is intended for accommodation and guiding rollers 4 to be machined. Mounted within the housing 1 is a spindle 5, mounting a machine tool 6. The tool 6 is made hollow and its inside surface 7 corresponds to the outer surface of the drum 2 arranged coaxially in said tool space.

The tool 6 is driven by a worm wheel 8 secured on the spindle 5 and engaged with a worm 9 mounted in bearings inside the housing 1.

Abrasive suspension is supplied into the zone of machining the rollers 4 from a tank (not shown in the drawing) through a pipe line 10 and opening 11 in the drum 2.

The "drum-tool" pair can be made either cylindrical or conical.

Figure 2:
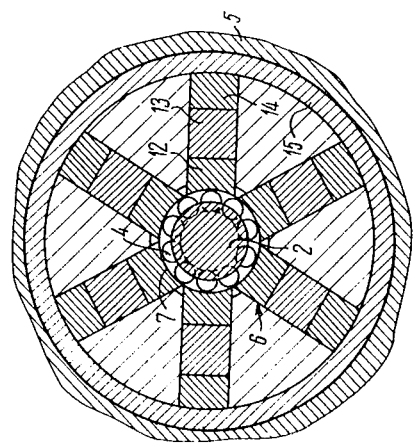
FIG. 2 is a section along the line II–II of FIG. 1.

When the "drum-tool" pair is made cylindrical the tool is made split which allows to ensure tight pressing of the rollers 4 to the drum 2. The cylindrical tool 6 is cut along longitudinal planes into six sections 12 (FIG. 2). Clearances should be provided between the cut sections 12 of the tool 6. Each section 12 of the tool 6 is rigidly connected to a wedge 13 conjugated with a wedge 14 bearing upon a sleeve 15.

The sections 12 of the tool 6 are pressed against the rollers 4 by means of a pneumatic cylinder 16 which transfers the force onto the tool 6 through the movable wedges 14.

When the "drum-tool" pair is made conical the tool is made solid.

The solid tool is pressed against the rollers 4 by displacing it axially also with the help of a pneumatic cylinder 16. However a conical tool can also be of a split design.

The same housing 1 accommodates the second "drum-tool" pair which is identical to the first one and driven from the same worm 9.

Both drums 2 are interconnected by two roller chutes, the upper one 17 (FIG. 1) and the lower one 18.

The upper roller chute 17 has a switch 19 for directing the rollers from the left-hand drum to the right-hand one or from the left-hand drum to the outlet.

The number of the "drum-tool" pairs in the machine can be different depending on a desirable output.

By increasing the number of the "drum-tool" pairs it is possible to make a uniflow system. In the machine for producing cylindrical rollers according to the invention provision is made of four "drum-tool" pairs pair-mounted in two housings 1 and 1' (FIG. 3).

Said two housing 1 and 1' are interconnected by a roller chute 20.

Coarse abrasive suspension is supplied to the zone of machining rollers in the housing 1 while the housing 1' is supplied with fine abrasive suspension.

The shaping of the convex rolling surface of the cylindrical roller 4 is ensured by that the roller placed by the spiral groove 3 of the drum 2 at an angle $\alpha$ (FIG. 4), to the generatrix of the inner space 7 of the tool 6, contacts with said surface in the inclined plane. The angle $\alpha$ of the roller inclination is equal to the helix angle of the spiral groove 3. The trace of intersection of the cylindrical surface by the inclined plane forms an ellipse while the generatrix of the convex rolling surface of the roller 4 after its machining is an arc of said ellipse. The greater the helix angle of the spiral groove 3 of the drum 2 and the smaller the inside diameter of the tool 6, the more is the curvature of the generatrix of the roller 4.

Figure 5:
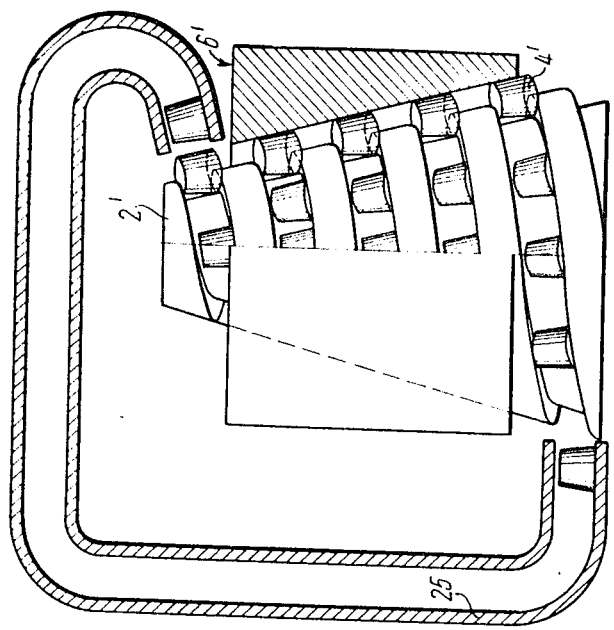
FIG. 5 is a diagram of the drum and tool for tapered rollers, according to the invention.
Figure 4:
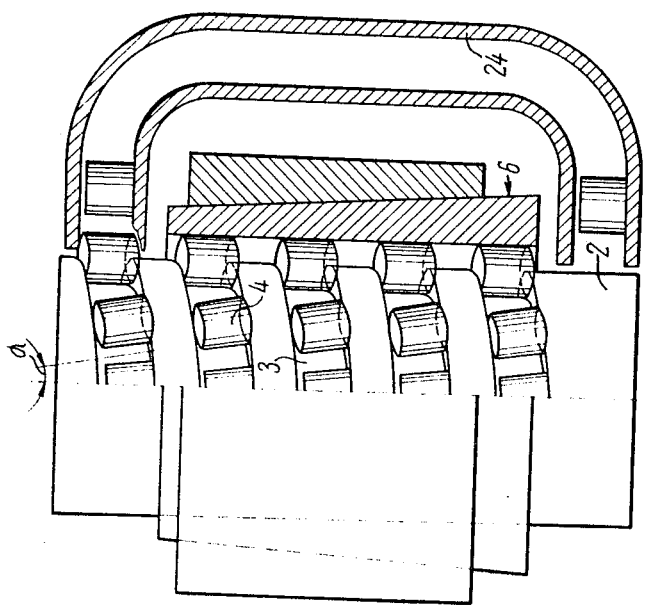
FIG. 4 is a diagram of the drum and tool for cylindrical rollers, according to the invention.

The convex rolling surface of the tapered rollers 4' (FIG. 5) is shaped in the manner similar to the shaping of the same surface of the cylindrical rollers 4 (FIG. 4). The trace produced by an inclined plane intersecting all the generatrices of the conical surface of the tool 6 is an ellipse, the generatrix of the roller 4' being the arc of said ellipse.

The spherical end face of the tapered roller 4' is shaped by the conical profile of the drum 2' and tool 6'. The greater taper of the "drum-tool" pair the more convex is the end face of the roller 4'. The reverse taper allows the concave surface of the end face to be obtained.

The machine for producing convex rolling surface of rollers operates as follows:

The rollers 4 to be machined are charged into a hopper 21 (FIG. 3). A feeder 22 delivers them along a roller chute 23 into the machining zone.

As soon as the spiral grooves 3 (FIG. 1) of the two drums 2 of the lower connecting roller chute 18 and upper connecting roller chute 17 are filled with rollers 4 the pneumatic cylinder 16 is engaged.

Then the feeder 22 is disengaged and the machining starts. The revolving tool 6 makes the rollers 4 to move along spiral groove 3 while they slide along the inside cavity 7 of the tool 6. During one revolution of the roller 4 each point of its rolling surface is machined by the tool 6. As is known, the cutting action can be performed provided the tool and the material move with respect to each other. When the rolling surface of the roller 4 is being machined its motion with respect to the tool 6 is provided owing to said roller 4 travelling along the spiral groove 3. The effort developed during the cutting action makes the face of the roller 4 to press against the side of the spiral groove 3 and the roller, while turning and rolling along the bottom of the groove 3, rubs against its side with the face; if some abrasive suspension is involved in this process the face is machined. In this case the side of the spiral groove simultaneously acts as a tool.

In the machine first "drum-tool" pair the rollers being machined move upwards and their lower faces are also subjected to machining whereas in the second "drum-tool" pair the rollers move downwards and their upper faces are machined. To preclude taper of cylindrical rollers, the roller chute 18 is made spiral so that the rollers passing along it turn with their upper face down.

The turning of the rollers can also be accomplished by an arc-shaped roller chute 24 (FIG. 4).

The rollers moving along the spiral groove 3 of the drum 2 (FIG. 1) turn with one or the other end down alternately which results not only in a uniform wear of the groove bottom but also in correcting it if the latter is made inaccurately.

When the tapered rollers are machined they are turned by a roller chute 25 (FIG. 5) through 360° and, consequently, only one working face of a roller is machined.

If only the rolling surface of the roller 4 is to be machined the tool 6 should be made of hard abrasive material and lubricant is fed instead of abrasive suspension. A combined type of machining is also possible wherein a tool is made of hard abrasive material and abrasive suspension is fed. When the machining is finished the feeder 22 is engaged again while the roller chute 17 is switched over for discharging machined rollers. Now a new batch of rollers is charged while premachined rollers are discharged and then delivered along the roller chute 20 for final machining into the third and fourth "drum-tool" pairs mounted in the housing 1'. The finished rollers are supplied into a storage 26 wherefrom they are delivered into a special container or onto a conveyor belt. The rollers leaving the machine have all their working surfaces machined and abrasive suspension rinsed off them.

The machine according to this invention can machine various solids of rolling for bearings. For this purpose the spiral groove of the drum should be shaped corresponding to the shape of the solids of rolling to be machined.

This machine is suitable for machining the following solids of rolling for bearings:

1. Cylindrical rollers having convex rolling surface, two flat faces being machined at a time;
2. Tapered rollers having convex rolling surface with simultaneous machining of a spherical (working) face;
3. Barrel-shaped rollers with simultaneous machining of one spherical or two flat faces;
4. Balls;

The shaping of barrel-shaped rollers is done essentially in the same manner as that of cylindrical or tapered rollers with a convex rolling surface.

The shaping of a ball is ensured by the fact that the ball, guided by a hollow tool, and revolving in the drum spiral groove has a variable axis of rotation. In this case both members, that is the drum and hollow tool are machine tools.

When describing a particular embodiment of the invention use has been made of special concrete terms. However, the invention is not limited by the terms used in the above description since each term used herein can be applied to all similar components which operate in like manner and serve analogous purposes.

Though the present invention has been described in connection with the preferable embodiment one should understand that changes and variations are possible provided the idea and scope of the invention remain unaltered which will be easily appreciated by those skilled in art. Such change and variations are considered to be within the essence and scope of the invention and the appended claims.

What I claim is:

1. A machine for producing convex rolling surface of rollers which comprises: a housing; a drum fixed on said housing and provided with a spiral groove on its outer surface for locating and guiding said rollers; a hollow tool whose inner surface corresponds to the outer surface of said drum; said drum being arranged coaxially in said tool; a means for driving said tool, means for pressing said tool against the rollers being machined.

2. A machine as claimed in claim 1, wherein said drum and the inner surface of said tool are cylindrical, and said tool is split along longitudinal planes forming segments.